Dec. 27, 1927.

W. FOLEY 1,654,417

TRACTOR HITCH

Filed March 12, 1927

Inventor.
WILLIAM FOLEY
By Victor J. Evans
Attorney

Patented Dec. 27, 1927.

1,654,417

UNITED STATES PATENT OFFICE.

WILLIAM FOLEY, OF CENTRAL POINT, OREGON.

TRACTOR HITCH.

Application filed March 12, 1927. Serial No. 174,857.

This invention relates to improvements in tractor hitches.

The principal object of this invention is to provide a tractor hitch whereby a cultivator implement may be secured to a tractor in such a manner that the tractor may be turned in soft ground without skidding the front wheels as well as the wheel of the implement attached to the tractor.

Another object is to provide means whereby the tractor may be prevented from tipping over thereby injuring the operator.

Another object is to produce a device of this character which may be attached to the standard tractor without materially altering the construction of the same.

A further object is to provide a hitch which may be readily constructed thereby providing an economically made device.

Other objects and advantages will be apparent during the course of the following description.

Figure 1:
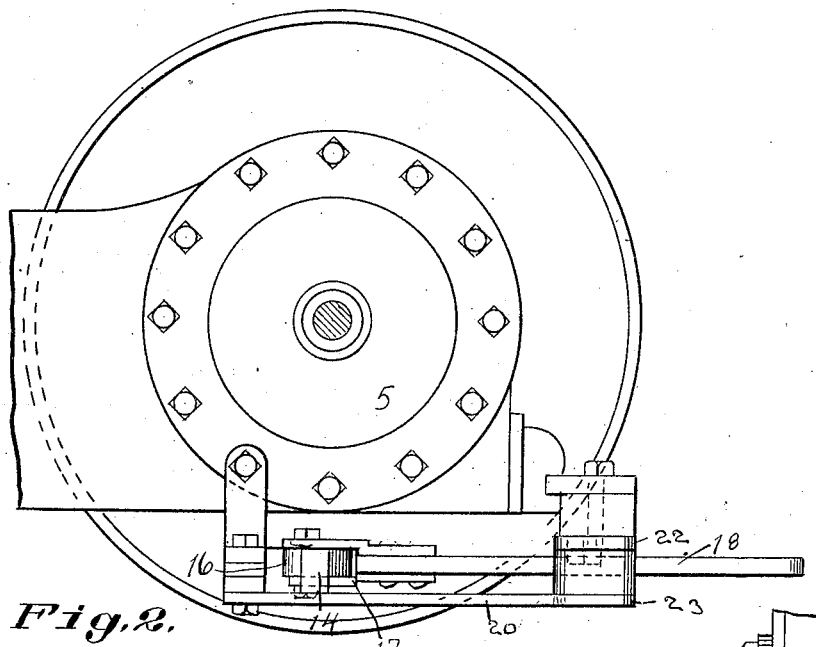
Figure 2:
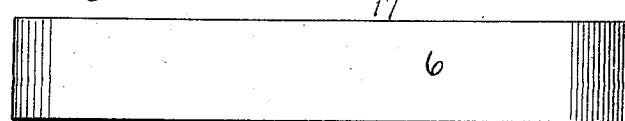
Figure 3:
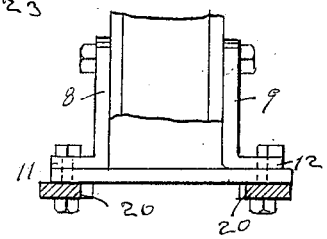
Figure 3:
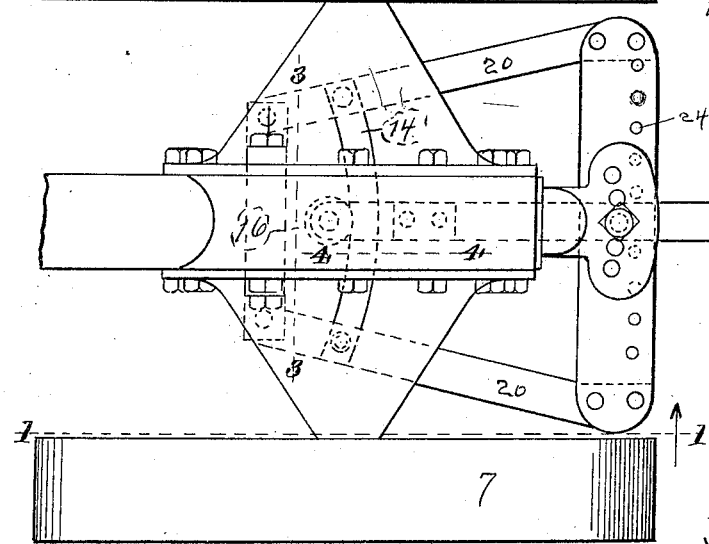
Figure 4:
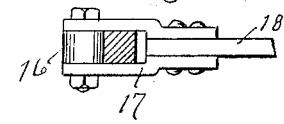

In the accompanying drawings forming a part of this specification, and in which like numerals are employed to designate like parts throughout the same, Figure 1 is a side elevation of my improved hitch as the same would appear attached to a tractor, Figure 2 is a top plan view of a portion of the tractor having my hitch attached thereto, Figure 3 is a top plan view of the tractor fastening yoke, and Figure 4 is a cross-section taken on the line 4—4 of Figure 2.

It has been common to connect an implement directly to the rear of a tractor by means of a rigid link with the result that many accidents have occurred due to the tractor turning over upon the operator, further with the rigid link construction it is impossible to secure the proper turning movement without skidding the front wheels of the vehicle or the implement being overturned. With my invention these disadvantages have been overcome.

In the accompanying drawings wherein for the purpose of illustration is shown a preferred example of my invention, the numeral 5 designates the differential housing of a tractor, having wheels 6 and 7. To the underside of the housing 5 I attach tractor engaging bars 8 and 9. These bars extend downward and have outwardly flared ends shown at 11 and 12, respectively. To these flared ends is secured a bar 13. The fastening yoke thus formed is connected to braces 20 between which a yoke 14 having an arcuate front face is secured, against which a roller 16 is adapted to contact. This roller is pivoted between the forked extremity 17 of a draw bar 18, which draw bar is adapted to be connected to the implement being drawn.

In order to prevent excessive up and down movement of the draw bar 18, I provide spaced guide bars 22 and 23 which are connected to the braces 20. These guide bars have perforations 24 therethrough for the purpose of inserting a limiting pin if desired, so as to offset the tractor with respect to the implement being drawn.

The manner of employing my device is as follows:—

Assuming that the same has been attached to a tractor as indicated in Figure 2, an implement such as a plow or harrow is secured to the end 26 of the draw bar 18, and when the tractor is moved over the ground, the roller 16 will move to the point in the yoke which represents a direct pull from the tractor to the implement, it being noted that this yoke 14 is directly beneath the rear end. When the tractor tends to turn either to the right or to the left, the roller will cause the point of pull to the draw bar to move over to the right or left as the case may be, so as to always maintain a direct line pull. This changing of the pull point will prevent the front wheels from skidding as is now the case, when the draw bar is rigidly attached to the vehicle.

When a condition arises wherein it is necessary to have the implement offset with respect to the tractor, this may be accomplished by inserting a pin through one of the perforations of the bars 22 and 23, against which the draw bar will contact during the time the implement is offset.

It will thus be seen that by this simple arrangement of parts, I have provided a device wherein all of the objects above set forth will be accomplished in an efficient manner.

It is to be understood that the form of my invention herewith shown and described is to be taken as a preferred example of the same and that various changes relative to the shape, size, material and arrangement of parts may be resorted to without departing from the spirit of the invention, or the scope of the subjoined claim.

In military work particularly during war times it is necessary to quickly position heavy tractor drawn guns or any similar machinery and the saving of time is important. Applicant's invention enables this to be done as the tractor may be turned on its turning radius without skidding the front wheels of the tractor. Applicant has proven that the most efficient point to have the roller contact is directly beneath the rear axle as illustrated to advantage in the drawing of this application. This construction causes the tractor to ride without placing strain upon the front of the tractor causing the same to dig into the ground and also prevents the tractor from turning over backwards onto the operator, a condition which often occurs particularly when going up a grade. This same draft principle may also be used as a coupling between railway cars and trailers for automobile use. By employing the rear guide bars the roller is maintained upon the race or yoke thereby preventing injury to the roller while at the same time the draw bar is free to swing to any angle without a binding action occurring, at the same time the tractor may be backed without injury to the draft gear.

Having thus described my invention, I claim:—

In a tractor hitch, adapted to be attached to a tractor, comprising a pair of downwardly extending tractor engaging bars, secured to the tractor at a point in advance of the rear axle thereof, braces extending rearwardly from said downwardly extending bars, a yoke secured between said braces and positioned beneath the axle of the tractor, a draw bar having a bifurcated end and a roller positioned between said bifurcated end, said roller being free to roll on the front face of said yoke.

In testimony whereof I affix my signature.

WILLIAM FOLEY.